Jan. 18, 1966 A. KAISER 3,230,470

COMPRESSOR AND EXPANDER APPARATUS

Filed March 22, 1961

INVENTOR
ARTHUR KAISER
BY
Brumbaugh, Free, Graves & Donohue
HIS ATTORNEYS

United States Patent Office 3,230,470 Patented Jan. 18, 1966

3,230,470

COMPRESSOR AND EXPANDER APPARATUS

Arthur Kaiser, Trumbull, Conn., assignor to Columbia Broadcasting System, Inc., New York, N.Y., a corporation of New York Filed Mar. 22, 1961, Ser. No. 97,595
6 Claims. (Cl. 330—138)

Figures 1, 2:
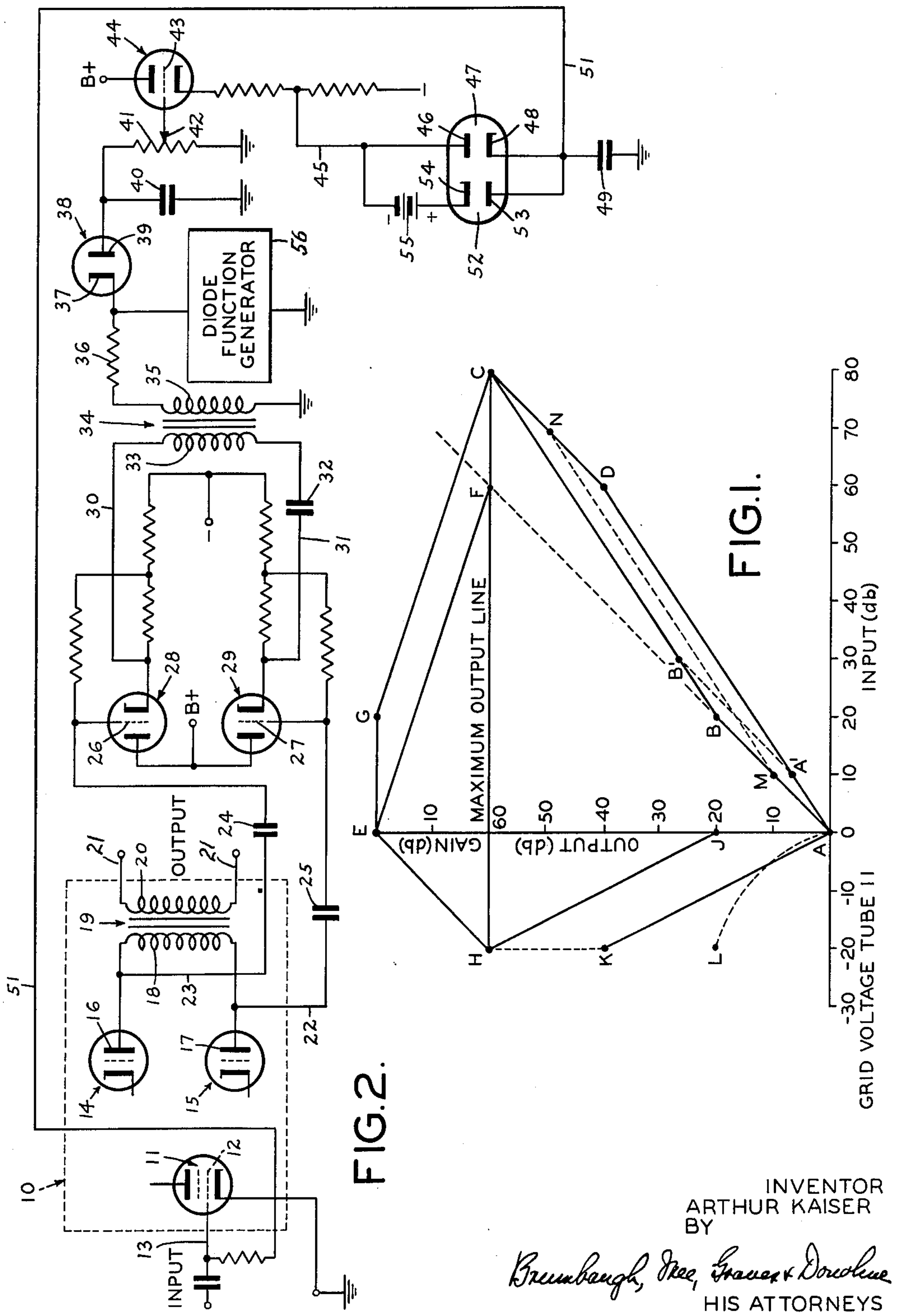

The present invention relates to signal compression and expansion apparatus and, more particularly, to apparatus of this character in which the system gain is automatically modified as a function of signal level in a simple and highly effective manner.

The copending application of Benjamin B. Bauer for "Signal Compressor and Expander Apparatus," filed March 22, 1961, Serial No. 97,636, discloses novel and highly effective compressor and expander apparatus in which a characteristic of a signal transmission channel is modified, preferably in a linear mode, as a function of signal volume level, with provision for operation after such modification without further modification so long as the signal level remains within a predetermined range or "platform." Embodied in sound recording-reproducing systems, such apparatus enables sound to be reproduced in a manner that is artistically satisfying to a high degree.

This application is addressed to another form of signal modifying apparatus of the general character described above which embodies means for automatically modifying a characteristic of a signal transmission channel in accordance with signal level in the manner outlined above. More particularly, the transmission channel incorporates control signal responsive means for modifying the characteristic and a control signal therefor is derived by charging capacitance means through unilaterally conducting devices connected in parallel to provide oppositely directed paths for current to and from said capacitance means, respectively. The unilaterally conductive device in the charging current path for the capacitance means is biased so as to remain nonconducting until the voltage input to the unilaterally conductive devices has risen a predetermined amount above the bias voltage. The fixed bias employed for this purpose establishes the limits of the "platform" or range of variation in signal for which no modification of the transmission channel characteristic takes place.

For a better understanding of the invention, reference is made to the following detailed description of a representative embodiment, taken in conjunction with the accompanying drawings, in which:

FIG. 1 shows in graphical form several curves that are helpful in understanding the invention; and FIG. 2 is a schematic diagram of a typical sound compressor circuit embodying the invention.

For purposes of illustration, the invention will be described as embodied in a compressor device for compressing the dynamic range of a signal to a smaller range.

As set forth in the aforementioned copending application Serial No. 976,636, the operating limits desired for a compressor device according to the invention are represented graphically by the boundary ABCDA in FIG. 1. For an initial input signal dynamic range, say 0–20 db, it is desired that the gain of the compressor device remain constant as indicated by the line AB in FIG. 1. As the input signal level increases beyond the upper limit of the initial range (20 db), the gain is required to diminish automatically with increasing signal so that linear compression of the signal is effected up to the maximum input (80 db in FIG. 1), as represented by the line BC. However, for decreasing input signal levels after attainment of any peak level in the range BC (FIG. 1), the gain remains constant, for a decrease in signal level of, say, 20 db, at the value obtaining at the instant the signal level last changed from increasing to decreasing. As the input signal level continues to drop below the constant gain "platform" or range, the gain now increases with decreasing signal level, this operating condition being represented by the line AD in FIG. 1. If the input signal level drops to zero, the output signal drops instantaneously with the input along the line AD, the gain being rapidly raised to 0 db.

By way of example, assume that the input signal level increases steadily from zero to a maximum value of 30 db and then decreases steadily to zero. During the rise in signal level from 0 to 20 db, the gain of the compressor will remain constant as indicated by the line AB in FIG. 1. For the continued rise in signal level from 20 db to 30 db, the compressor gain will be continuously reduced in such fashion as to produce linear compression of the signal in this range, as represented by the line BB′ in FIG. 1. As the signal level then decreases from 30 db to 10 db, the compressor gain will remain constant at the value corresponding to the point B′ in FIG. 1. For decreasing signal level from 10 db to zero, the compressor gain now increases quickly at a uniform rate as indicated by the line AA′, which corresponds to linear compression of the same character as that represented by the line BC. This mode of operation may be viewed as linear mode compression along the line MN (FIG. 1) with provision for ±10 db uncompressed operation about this line.

In FIG. 2 is shown a practical form of compressor device which is capable of meeting the operating conditions depicted in FIG. 1. It comprises a conventional adjustable gain amplifier 10 having an input stage including an electron tube 11 with a control grid 12 which is adapted to receive an input signal over a conductor 13. The tube 11 is preferably a so-called variable mu tube, such as the type 6SK7, for example. The amplifier 10 may also have one or more intermediate stages (not shown) and an output stage including a pair of electron tubes 14 and 15 having anodes 16 and 17, respectively, connected to the primary winding 18 of a transformer 19. The secondary winding 20 of the transformer 19 is adapted to supply the amplifier output to the terminals 21.

In accordance with the invention, linear compression with provision for a constant gain "platform" over a suitable signal level range is adapted to be effected by controlling the grid bias applied to the grid cathode circuit of the tube 11 in response to a biasing signal derived from the output of the amplifier 10. To this end, the amplifier output is supplied from the anodes 16 and 17 of the tubes 14 and 15, respjectively, through the conductors 22 and 23 and the capacitors 24 and 25 to the control grids 26 and 27 of a pair of electron tubes 28 and 29, respectively. The tubes 28 and 29 are connected as cathode followers which are adapted to supply outputs over the conductors 30 and 31 through a capacitor 32 to the primary winding 33 of a transformer 34. The secondary winding 35 of the transformer 34 supplies an output through the resistor 36 to the cathode 37 of a diode 38 having an anode 39 connected through a capacitor 40 and a potentiometer 41 in parallel to ground.

The potentiometer 41 has a slider 42 which is connected to the control grid 43 of an electron tube 44 functioning as a cathode follower which supplies an output over a conductor 45 to the anode 46 of a diode 47. The cathode 48 of the diode 47 is connected through a capacitor 49 to ground. The output appearing across the capacitor 49 is fed over a conductor 51 to the grid circuit of the tube 11 in the amplifier 10. Connected in shunt with the diode 47 is a second diode 52 having its anode 53 and cathode 54 connected to the cathode 48 and anode 46, respectively, of the diode 47. Normally, the diode 52 is biased by a source of bias voltage such as a conventional battery 55 to be nonconducting until a predetermined value of negative voltage is applied to the cathode thereof.

For linear mode compression as represented by the line BC in FIG. 1, with increasing signal level, the gain of the amplifier 10 should vary in the manner indicated by the line GC. Assuming that the tube 11 is a type 6SK7, the gain versus grid voltage characteristic required to achieve this form of gain variation is represented by the line HE in FIG. 1. This relation is linear and the slope of the curve is approximately 1 db per volt. The line HJ represents the control voltage as a function of compressor output which is required to yield the desired linear mode of compression for increasing signals.

Similarly, the line EF in FIG. 1 represents the manner in which the gain of the amplifier 10 is required to vary with decreasing signals to effect linear mode compression according to the line AD in FIG. 1; and the line KA indicates how the control voltage supplied to the grid cathode of the tube 11 should vary with compressor output to produce the desired gain variation.

It will be noted that for both increasing and decreasing signals the control voltage is required to vary linearly with the output signal in db, in order to effect linear mode compression in the manner indicated. However, the rectified output appeoring across the capacitor 49 varies in a nonlinear manner with the compressor output signal, as shown by the dotted line curve AL in FIG. 1. It is desirable, therefore, to provide means for converting the relation between the output signal and the rectified control voltage to a linear form. This may be accomplished in any suitable manner as by connecting a function generator 56 between ground and a point between the resistor 36 and the cathode 37 (FIG. 2). The function generator 56 may be of the diode clamp type disclosed in the aforementioned copending application Serial No. 97,636. In this manner, the nonlinear relation depicted by the curve AL in FIG. 1 may be converted to a line curve such as the line KA, for example.

Upon inspection of FIG. 1, it will be observed that the curves KA and HJ are identical except for a 10 volt displacement. Accordingly, if the bias voltage established by the battery 55 is 10 volts, and if the voltage supplied over the conductor 45 follows the relation represented by the curve KA in FIG. 1, then the voltage appearing across the capacitor 49 will follow the relation represented by the curve HJ for increasing signals and the relation KA for decreasing signals as required. This will be apparent from the following considerations.

When the voltage at the conductor 45 is increasing but is less than minus 10 volts, neither the diode 47 nor the diode 52 conducts and the voltage across the capacitor is zero. When the increasing voltage at the conductor 45 exceeds 10 volts negative, the diode 52 conducts and charges the capacitor 49 to a voltage equal to the amount of the excess voltage. Assuming that the voltage across the capacitor 49 does not leak away, the diode 47 will not begin to conduct until the voltage at the conductor 45 has dropped below the value of the voltage across the capacitor 49, i.e., more than 10 volts. Hence, the voltage across the capacitor 49 and, therefore, the bias on the grid of the tube 11 will remain constant until the output signal has dropped 20 db. The capacitor then discharges through the conductive diode 47 to vary the bias on the grid of tube 11 in accordance with the variation in the voltage supplied by the cathode follower 44.

While the system shown in FIG. 2 is designed for linear mode compression with a compression exponent of ¾ and for a "platform" of 20 db, it will be understood that other compression exponents and "platform" values can be used, depending upon the characteristics desired.

For operation as an expander, the diodes 38, 47 and 52 in FIG. 2 should be reversed in polarity. Also, the diode function generator 53 should be appropriately designed as explained in the aforementioned copending application Serial No. 97,636, to provide the proper relation between the amplifier output voltage and the grid voltage required to be supplied to the grid cathode circuit of the tube 11 (FIG. 2). By appropriate design, it will be understood that an expander may be designed to expand a signal in complementary fashion to the mode of compression originally applied thereto.

The invention thus provides highly effective means for automatically modifying a characteristic such as the gain or frequency response of a signal transmission channel in accordance with signal level. By effecting the modification in a linear mode with provision for a signal level range "platform" of suitable extent at each signal level, in which the characteristic does not change, the desired modification can be accomplished without perceptible deterioration of the intelligence carried by the signal. Embodied in sound compression and expansion apparatus, it enables reproduction to be achieved in a manner that is most satisfying artistically.

It will be understood that the control signal in the several embodiments described above can be derived from the input signal instead of the output signal, although the latter is preferred. Also, the several aspects of the invention may be applied with equal effectiveness to each of the channels of a stereophonic system. In such case, however, the control signal for each channel should preferably be a function of the combined signals in the channels.

The invention is not limited to sound reproducing systems or to modification of signal level but is susceptible of utility in any system where modification of any characteristic of a signal transmission channel as a function of signal level is desirable or necessary. For example, it may be utilized in systems for controlling the frequency response of a signal transmission channel. Also, it may be embodied in picture transmission systems to compress the wide range of signal intensities picked up by a scanning system to a smaller range than can be accommodated by the transmission system. It is also possible to achieve "platform" compression (or expansion) by means such as an adjustable attenuator controlled automatically in response to signal level, instead of using an adjustable gain amplifier.

The several embodiments of the invention described above and illustrated in the drawings are obviously susceptible of modification in form and detail. The invention, therefore, is not to be limited thereto but is intended to encompass all modifications falling within the scope of the following claims.

I claim:

1. In automatic signal control apparatus, the combination of signal transmission channel means having input means and output means, means coupled to said transmission channel means and responsive to a control signal to modify a signal transmitting characteristic thereof, capacitor means coupled to said modifying means for supplying a control signal thereto, means responsive to the signal level at a predetermined point in said channel means for controlling the charge on said capacitor to develop a control signal including a pair of unilaterally conductive means, means coupling one terminal of each of said unilaterally conductive means to said capacitor to provide paths of opposite directions of conductivity for said capacitor, and biasing means connecting the other terminal of one of said unilateral means to the other terminal of the other of said unilateral means, the common connection of said biasing means and the other terminal of said other unilateral means being coupled to said predetermined point in said channel means.

2. Automatic signal control apparatus as defined in claim 1 in which said first and second unilaterally conducting means and said biasing means develop a control signal on said capacitor to which said modifying means is responsive to effect compression of the transmission channel signal level in a linear mode.

3. Automatic signal control apparatus as defined in claim 1 in which the first and second unilaterally conducting means and biasing means develop a control signal on said capacitor to which said modifying means is responsive to effect expansion of the transmission channel signal level in a linear mode.

4. In automatic signal control apparatus, the combination of signal transmission channel means having input means and output means, means coupled to said transmission channel means and responsive to a control signal to modify the gain thereof, capacitor means coupled to said modifying means for supplying a control signal thereto, means coupled to said signal transmission channel means output means at a predetermined point therein and including first unidirectionally conductive means having anode and cathode electrodes, the anode electrode of said first unidirectionally conductive means being coupled to said capacitor means for charging the same to develop a control signal, biasing means in series with the cathode of said first unidirectionally conductive means and between said first unidirectionally conductive means and said predetermined point in said channel means for rendering said first unidirectionally conductive means nonconductive for a predetermined range of values of transmission channel means signal level, and means coupled to said channel means output means at said predetermined point and including second unidirectionally conductive means having anode and cathode electrodes, the cathode electrode of said second unidirectionally conductive means being coupled to said capacitor means and to the anode electrode of said first unidirectionally conductive means, and the anode electrode of said second unidirectionally conductive means being coupled to said predetermined point in said channel means for discharging said capacitor means.

5. In automatic signal control apparatus, the combination of signal transmission channel means having input means and output means, means having a linear relation between gain in decibels and input in volts coupled to said transmission channel means for modifying the gain thereof in response to a control signal, capacitor means coupled to said modifying means for supplying a control signal thereto, means coupled to said signal transmission channel means output means at a predetermined point therein and including first unidirectionally conductive means having anode and cathode electrodes, the anode electrode of said first unidirectionally conductive means being coupled to said capacitor means for charging the same to develop a control signal, biasing means in series with the cathode electrode of said first unidirectionally conductive means and between said first unidirectionally conductive means and said predetermined point in said channel means for rendering said first unidirectionally conductive means nonconductive for a predetermined range of values of transmission channel means signal level, means coupled to said channel means output means at said predetermined point and including second unidirectionally conductive means having anode and cathode electrodes, the cathode electrode of said second unidirectionally conductive means being coupled to said capacitor means and to the anode electrode of said first unidirectionally conductive means, and the anode electrode of said second unidirectionally conductive means being coupled to said predetermined point in said channel means for discharging said capacitor means, and means interposed between said channel means output means and said modifying means for altering the relation between the transmission channel means output and the modifying means input.

6. In automatic signal control apparatus, the combination of signal transmission channel means having input means and output means, means having a linear relation between gain in decibels and input in volts coupled to said transmission channel means for modifying the gain thereof in response to a control signal, means coupled to said transmission channel means, output means for rectifying the output of said channel means, capacitor means coupled to said modifying means for supplying a control signal thereto, means responsive to the rectified output of said rectifying means and including first unilaterally conductive means coupled to said capacitor means for charging the same, biasing means connected in circuit with said first unidirectionally conductive means, means responsive to the rectified output of said rectifying means and including second unilaterally conductive means coupled to said capacitor means for discharging the same, and function generator means interposed between said transmission channel means output means and said rectifier means for altering the output from said output means in such fashion that said modifying means modifies the gain of said transmission channel means in a linear mode.

References Cited by the Examiner

UNITED STATES PATENTS

| | | | |
|---|---|---|---|
| 2,585,890 | 2/1952 | Wolfe | 330—134 |
| 2,799,735 | 7/1957 | Breckman et al. | 330—141 |
| 2,817,715 | 12/1957 | Blake | 333—14 X |

ROY LAKE, *Primary Examiner.*

BENNETT G. MILLER, *Examiner.*